United States Patent [19]

Stockton

[11] Patent Number: 4,713,041
[45] Date of Patent: Dec. 15, 1987

[54] NON-LUBRICATED DRIVE BELT SYSTEM FOR A CONTINUALLY VARIABLE TRANSMISSION

[75] Inventor: Thomas R. Stockton, Ann Arbor, Mich.

[73] Assignee: Ford Motor Company, Dearborn, Mich.

[21] Appl. No.: 907,273

[22] Filed: Sep. 15, 1986

[51] Int. Cl.$^4$ .............................................. F16H 11/04
[52] U.S. Cl. ........................................ 474/28; 277/73
[58] Field of Search ....................... 474/28, 43, 11, 12, 474/17, 8, 94, 902, 903, 69, 70; 277/73, 74, DIG. 8, 167.3, 59, 65; 74/689, 695, 732, 740; 384/94, 130

[56] References Cited

U.S. PATENT DOCUMENTS

| 3,600,961 | 8/1971 | Rattunde | 474/28 X |
| 4,348,197 | 9/1982 | Oliver | 474/28 |
| 4,425,102 | 1/1984 | Huff et al. | 474/28 |

FOREIGN PATENT DOCUMENTS 1081733  5/1960  Fed. Rep. of Germany ........ 474/28

Primary Examiner—Stephen J. Novosad
Assistant Examiner—Thuy M. Bui
Attorney, Agent, or Firm—Frank G. McKenzie; Donald J. Harrington

[57] ABSTRACT

A belt driven automatic transmission for producing a continuous range of drive ratios includes an input pulley rotatably mounted on the axis of an engine crankshaft and an output pulley rotatably supported on the axis of the transmission output shaft. The pulleys are driveably connected by an endless drive belt, whose radial position on the pulleys varies in accordance with the position of axially displaceable sheaves that move in accordance with the magnitudes of pressure in actuating cylinders. The pulley system is driveably connected to the impeller of a hydrokinetic torque converter whose turbine is driven from the impeller. The turbine is continuously connected to the output shaft. A forward and reverse planetary gearset is driven from the transmission selectively in accordance with the position of synchronizer sleeve. The carrier of the gearset is integrally formed with a driving sprocket engaged by an endless drive chain that is driveably connected to an output sprocket rotatably supported on the axis of a differential mechanism. Right-hand and left-hand axle shafts that support the drive wheels of the vehicle are driven differentially by the differential mechanism through a constant velocity joint.

8 Claims, 8 Drawing Figures

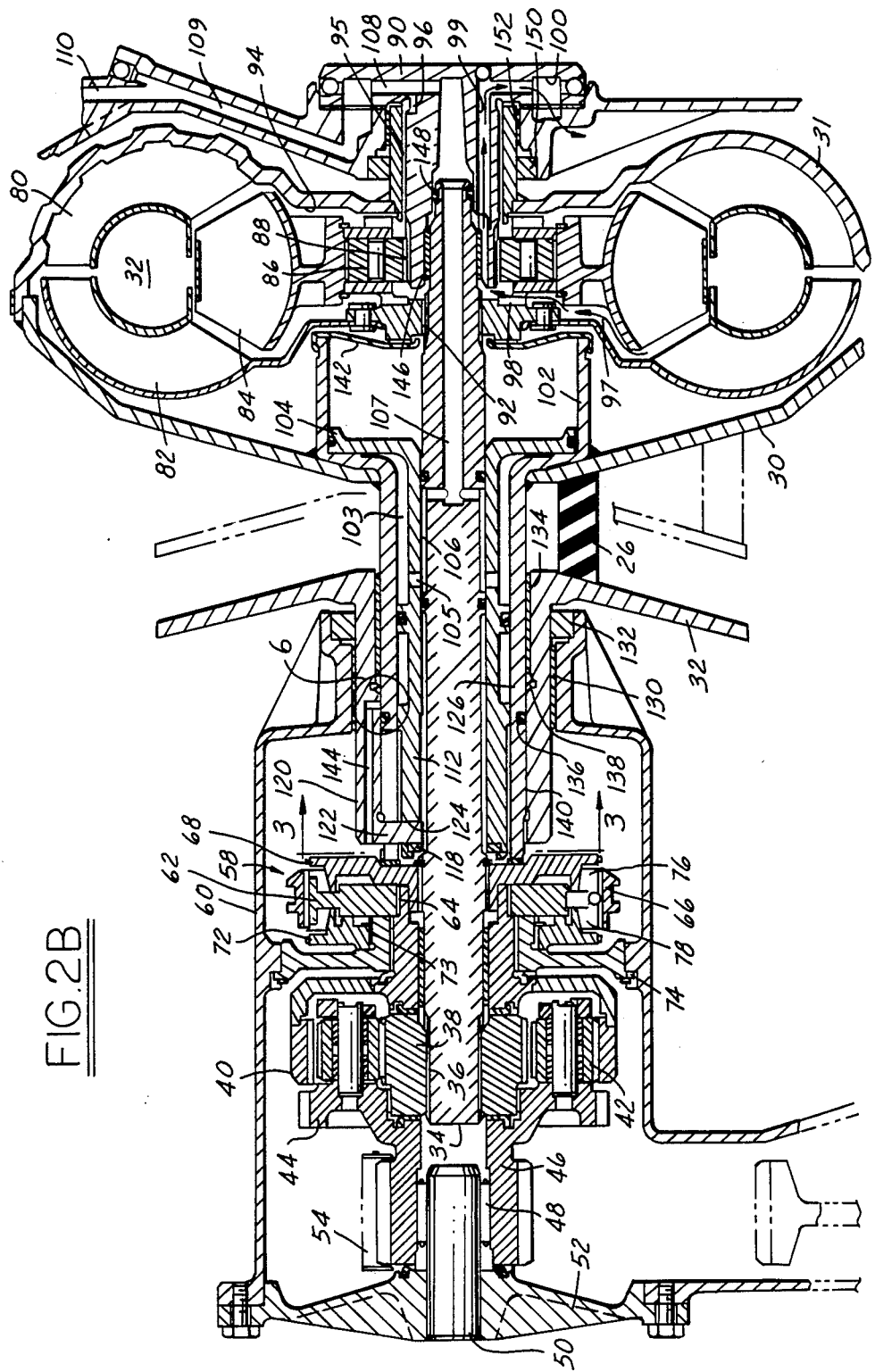

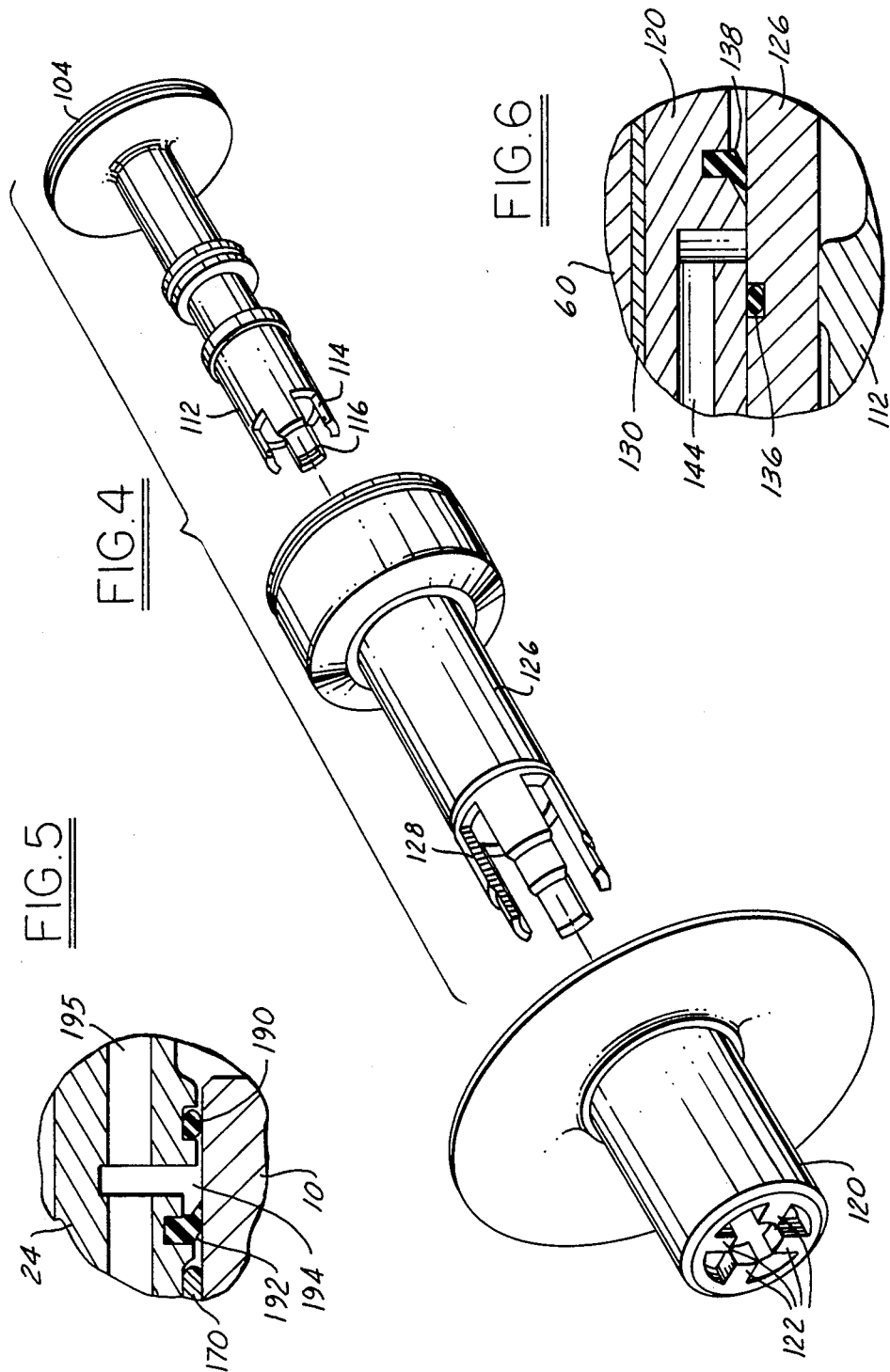

NON-LUBRICATED DRIVE BELT SYSTEM FOR A CONTINUALLY VARIABLE TRANSMISSION

BACKGROUND OF THE INVENTION

1. Field of the Invention

This invention relates to the field of automatic transmissions for automotive vehicles and more particularly pertains to the lubrication system and hydraulic seals for belt driven automatic transmissions that produce continually variable drive rations.

2. Description of the Prior Art

Automatic transmissions having an input pulley driven from the engine shaft and an output pulley connected to the vehicle wheel have been developed to produce a continually variable ratio of the speed of the output pulley in relation to the speed of the input pulley by varying the redius at which an endless drive belt or chain engages the respective pulleys. Steel chains that transmit torque between the pulley assembly either by tension or compression developed in the chain must operate in a lubricated environment in order to realize an acceptable service life. However, v-belts made of rubber and composite materials can be substituted for the steel chain to engage conical surfaces formed on the input pulley and output pulley. The coefficient of friction on the adjacent surface of the v-belt and the pulley sheaves is approximately five times higher than the coefficient of friction on the lubricated steel belts and pulley surfaces. The higher coefficient of friction allows the clamping loads applied to the displaceable sheaves of the pulley assembly to be substantially reduced in comparison to the clamping loads required to engage lubricated steel belts on these surfaces. Lower clamping load reduces the cost of the transmission and allows substantially lower hydraulic actuating pressures to transmit torque between the pulleys.

However, in order to realize these advantages, the surfaces of the pulleys that engage the v-belt, the belt surfaces and the space within which the belt and pulleys operate should be entirely free from lubricant, clean and dry.

Automatic transmissions of this type include a source of high pressure hydraulic fluid connected to hydraulic cylinders whose pressure moves a piston, and a displaceable sheave connected to the piston to vary the effective radius at which the belt engages the pulley surfaces. The hydraulic actuation system and the lubrication system of the transmission must be sealed effectively to prevent the egress of hydraulic fluid into the space in which the sheaves and pulley operate. To maintain a dry operating environment for the belt requires the use of dynamic pressurized oil seals.

One sheave of each pulley assembly is axially displaceable and therefore requires support that permits rotation and axial displacement in a non-lubricated environment. The tensile force developed in the belt that transmits torque between the pulley assemblies produces a large bending moment at the hub of the fixed driven sheave. Support for the sheaves on the shafts on which they are supported requires that the moment tending to rotate the sheave on the shaft be reacted by a couple having a substantial couple arm. This requirement and the requirement for hydraulic sealing of the sheaves has been an important obstacle in the development of transmissions of this type that use a rubber belt to transmit power between the pulleys.

SUMMARY OF THE INVENTION

A variable drive ration transmission according to this invention is adapted to shift continually among the various drive ratios and includes an input pulley mounted for rotation parallel to the axis of the engine shaft. The input pulley includes a first sheave that rotates with the engine shaft but is fixed against displacement and a second sheave rotatable with the engine shaft and displaceable along the axis of the shaft. These sheaves define conical surfaces adapted to support rotatably and to drive an endless drive belt. The first sheave defines a starting gear on its periphery, which is adapted to be driven rotatably by a starting motor for crank starting the engine. Furthermore, the first sheave has sufficient inertia about the axis of the engine shaft so that it can function as the flywheel of the engine.

The transmission further includes an output pulley assembly mounted for rotation on an output shaft that is directed parallel to the engine shaft. The output pulley includes a third sheave that is nondisplaceably, rotatably mounted for rotation parallel to the axis of the output shaft and a fourth sheave similarly rotatably mounted but displaceable along the axis of the output shaft. The third and fourth sheaves define conical surfaces that are adaptable to driveably engage the inner conical surface of an endless drive belt.

The third sheave is formed integrally with the housing and impeller of a torque converter, mounted rotatably on an axis parallel with the output shaft. The turbine of the torque converter is driven hydrodynamically from the impeller and is connected directly to an output shaft directly parallel to the engine shaft. A forward and reverse planetary gearset includes a sun gear continually driven from the output shaft, a ring gear, a set of planetary pinions engaged with the sun gear and the ring gear, and a carrier for rotatably supporting the planetary pinion and connecting it driveably to a sprocket wheel adapted to be engaged by an endless chain belt.

A differential mechanism driven by the chain belt includes a sprocket wheel engageable by the chain belt and mounted for rotation parallel to the axle shafts of the vehicle, which are mounted generally parallel to the engine shaft and the output shaft. The differential includes a spindle carried by the output sprocket wheels, side bevel gears fixed to the axle shafts and a bevel pinion connected to the spindle and continuously engaged with the side bevel gear. Constant velocity joints connect each of the drive shafts to the axles that transmit power to the wheels.

Power is transmitted selectively from the output shaft to the forward and reverse gearing through operation of a synchronizer clutch. The clutch assembly includes a hub continually connected driveably to the ring gear and a clutch sheave displaceably mounted on the circumference of the hub for engagement alternately with the dog teeth of a first synchronizer disc continuously connected to the output shaft and the dog teeth of a second synchronizer disc fixed against rotation to the transmission casing.

The second and fourth sheaves are hydraulically actuated by operation of a piston operating within a hydraulic cylinder and supplied with pressurized hydraulic fluid. The third sheave of the output pulley assembly is formed integrally with the hydraulic cylinder in which a piston moves in accordance with the pressure of hydraulic fluid supplied to the cylinder. Its piston is fixed to the fourth sheave so that they rotate and move axially as a unit. The third sheave and the associated hydraulic cylinder rotatably connect to the fourth sheave and piston so that they rotate as a unit and permit displacement of the fourth sheave and its piston relative to the third sheave and cylinder.

The second sheave of the input pulley assembly and the fourth sheave of the output pulley assembly are supported rotatably on drive bushings, which permit the sheaves to slide axially toward and away from the other sheave of the respective pulley assembly. The hydraulic system of the transmission that pressurizes the cylinders and causes the pistons to move and to displace the second and fourth sheaves are sealed so that the hydraulic fluid does not flow past the drive bushing toward the conical surfaces of the sheaves and contaminate the drive surfaces of the belt, which is continuously in contact with the pulley assemblies. According to this invention, a first hydraulic seal in the form of an O-ring is fitted within a recess located on the surface of the shaft on which the displaceable sheaves are supported, and a wiper seal spaced along the axis of that shaft seals the interior portions of the hydraulic system from the exterior surfaces of the pulleys. A hydraulic passage has one end communicating with the space between the O-ring and the wiper seal and the opposite end extending into the interior of the hydraulic system so that the passage carries hydraulic fluid away from the space located between the O-ring and the wiper seal.

A hydraulic passage formed on the input pulley assembly connects the space between the O-ring and wiper seal with the interior of the hydraulic actuating cylinder. A hydraulic passage in the output pulley assembly connects the space with the sump of the transmission.

BRIEF DESCRIPTION OF THE DRAWING

FIG. 2B is a cross section through the axis of a torque converter, output pulley and gearset of the transmission.

FIG. 4 is a perspective view showing the torque converter sleeve, displaceable sleeve and actuator piston of the output pulley spaced axially from one another.

FIG. 5 is an enlarged view in cross section showing the hydraulic seals and passage in area 5 of FIG. 2B.

FIG. 6 is an enlarged view in cross section showing the hydraulic seals and passage in area 6 of FIG. 2A.

DESCRIPTION OF THE PREFERRED EMBODIMENT

Figure 1:
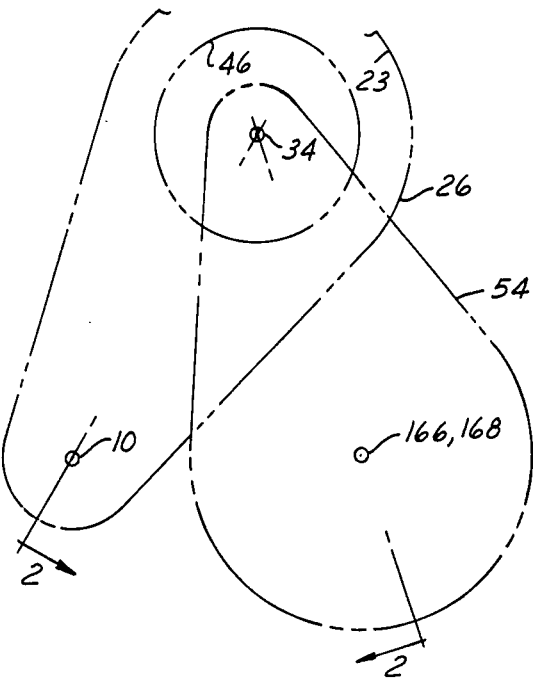
FIG. 1 is an end view showing the general arrangement of the engine shaft, transmission shaft, axle shafts and the belt and chain that interconnect them.
Figure 2A:
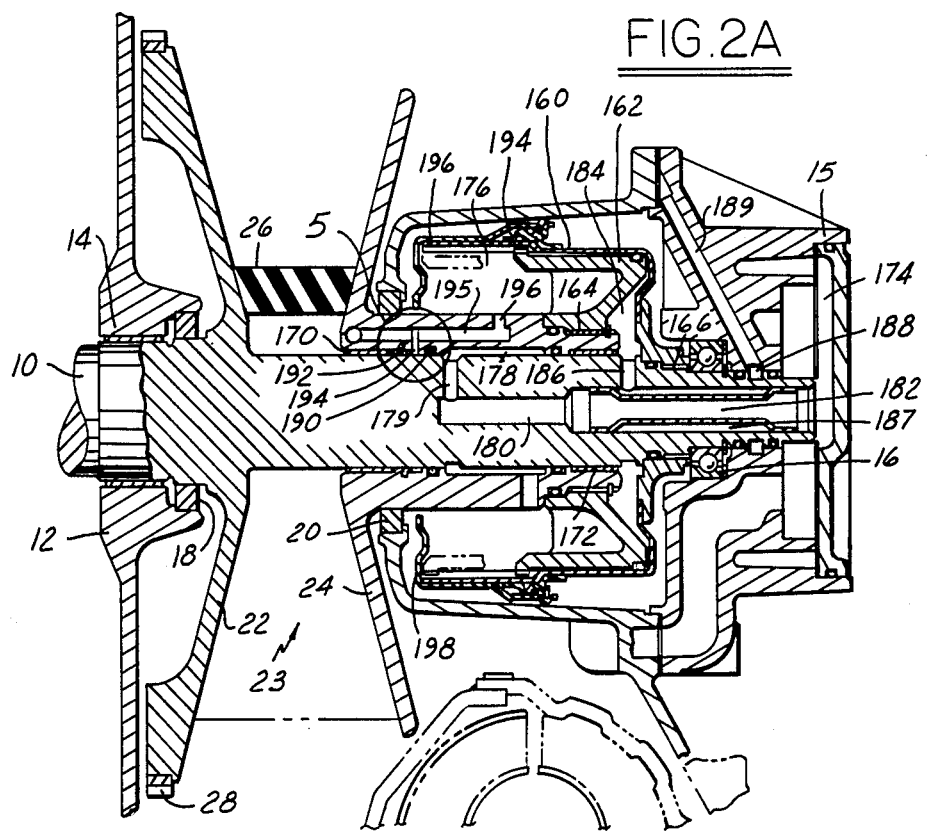
FIG. 2A is a cross section through the axis of an engine shaft, flywheel and input pulley for the continuously variable transmission according to this invention.

Referring first to FIG. 2A, the engine crankshaft 10 is supported on the engine block 12 at a rear main bearing 14 and on the transmission casing 15 at a support bearing 16. Oil seals 18, 20 prevent the flow of engine oil from the crankshaft and from the transmission housing, respectively. Formed integrally with the crankshaft is an axially nondisplaceable input sheave 22 and supported on the crankshaft is an axially displaceable sheave 24. Located between the inner conical surfaces of sheaves 22 and 24 that form the input pulley is an endless traction belt 26 whose lateral surfaces driveable engage the adjacent faces of the sheaves.

As sheaves 24 moves along the axis of shaft 10, belt 26 moves radially inward and outward from that axis to engage the sheaves at a variable radial position in accordance with the location of sheave 24 along the axis of the crankshaft.

In addition to supporting belt 26, sheave 22 functions as the flywheel of the engine and has located at its outer periphery a starter gear 28 that is driven by the starter motor.

Referring now to FIG. 2B, the drive belt also engages an axially non-displaceable output sheave 30, which forms a part of the casing of a hydrodynamic torque converter and an axially displaceable output sheave 32, adapted to move parallel to the axis of the transmission output shaft 34. The positions of sheaves 24 and 32 are coordinated so that the corresponding radial positions of the belt on the input and output pulleys correspond to the positions that will produce the desired drive ratios.

Figure 2C:
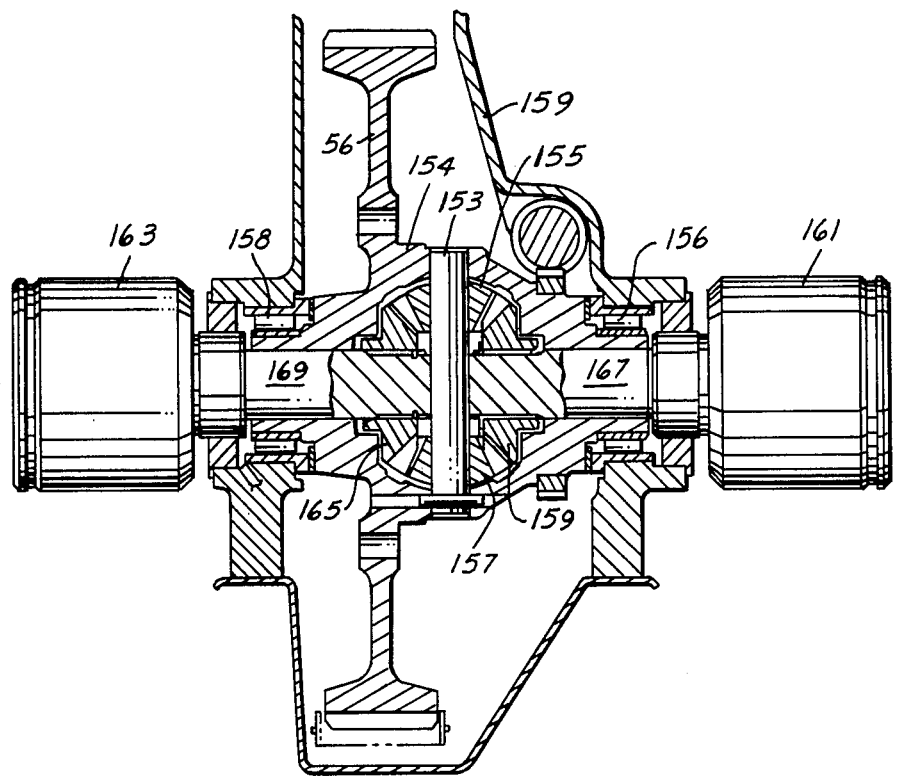
FIG. 2C is a cross section through the differential and axle shafts driven from the gearset of the transmission.
Figure 3:
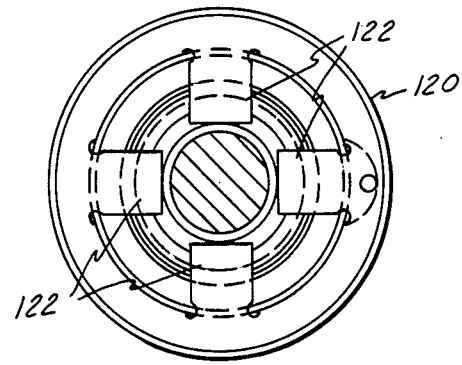
FIG. 3 is a cross section taken at plane 3—3 of FIG. 2B.

Output shaft 34 is continuously connected by a spline 36 to the sun gear 38 of a planetary gearset that includes a ring gear 40 and a set of planetary pinions 42 in continuous meshing engagement with the sun gear and ring gear and supported rotatably on a carrier 44, which is formed integrally with a chain drive sprocket 46. The sprocket is rotatably supported on a bearing 48 located between stub shaft 50, which is journalled on transmission casing 52, and the inner surface of the sprocket. An endless chain belt 54 continuously engages the teeth of sprocket wheel 46 and the teeth of an output sprocket wheel 56 that is part of the final output drive mechanism shown in FIG. 2C.

A synchronizer clutch 58 located within casing 60 includes a hub 62 continuously, driveable connected by splines 64 to ring gear 40. The hub carries on its outer periphery a slideably mounted sleeve 66 adapted to move parallel to the axis of shaft 34. The inner surface of the sleeve is formed with spline teeth that are adapted to remain continuously engaged with the splines on the outer periphery of the hub and to engage selectively spline teeth formed on the outer surface of the forward drive disk 68, which is continuously connected by a spline to shaft 34, and the reverse drive disk 72, which is fixed against rotation on the casing 60 by a splined connection 73.

The synchronizer and gearset operate to make a selective forward drive and reverse drive connection between sprocket wheel 46 and output shaft 34. When the synchronizer sleeve is moved rightward from the neutral position shown in FIG. 2B, it forces the inner conical surface of synchronizer ring 76 against the adjacent outer conical surface of disk 68 to synchronize the rotational speed of ring gear 40 and disk 68. When the speeds are synchronous, sleeve 66 is moved righward fully into engagement with the dog teeth on the periphery disk 68 while remaining engaged with hub 62. This causes sun gear 38 and ring gear 40 to rotate at the speed of the shaft 34 and the set of planet pinions 42, carrier 44 and sprocket wheel 46 to revolve about the axis of shaft 34 at the speed of shaft 34. Chain 54 transmits this motion to sprocket wheel 56.

When the synchronized sleeve is moved from the neutral position shown in FIG. 2B leftward, it forces the inner conical surface of synchronizer ring 78 into contact with the outer conical surface on disk 72, thereby connecting ring gear 40 to casing 60 through the splined connections 64, 73 and 74. When this occurs, sun gear 38 rotates at the speed of shaft 34, but the planet pinion set rotates on the fixed surface of ring gear 40 in the opposite rotational sense, thereby causing carrier 44 and sprocket wheel 46 to turn in the reverse direction.

In addition to supporting the drive belts, sheave 30 forms a portion of the casing of the torque converter which includes a set of pump or impeller blades 80, turbine blades 82, and stator blades 84. The stator is driveably connected through a one-way clutch 86 and a splined connection 88 to the transmission casing 90. The impeller blades are joined to a portion of the torque converter casing 31 that is welded to sheave 30. The turbine, which is hydrodynamically driven by the impeller, is connected by a spline 92 to the transmission output shaft 34. Therefore, as output sheave 30 is driven rotatably by drive belt 26, the turbine blades are driven hydrodynamically from the impeller and cause the output shaft 34 to rotate.

The torque converter is supplied with hydraulic fluid through passages 94–96 and hydralic fluid is returned to the transmission sump through passages 97–100.

The hydraulicfluid leaving the torque converter enters hydraulic cylinder 102 in which a piston 104 moves rightward and leftward parallel to the axis of shaft 34 in accordance with the magnitude of hydraulic pressure present in the space 106 located within the cylinder on the opposite side of piston 104 from the space that is filled by fluid leaving the torque converter. Space 103 is supplied with pressurized hydraulic fluid through passages 105–110. Piston 104, which is sealed at its periphery by an O-ring in contact with the inner wall of the cylinder 102 includes a cylindrical portion 112 formed with multiple recesses 114 directed parallel to the axis of the shaft and shown in FIG. 4. On the inner surface of the piston near the left-hand extremity are circumferential recesses 116 adapted to receive a snap ring 118 that limits axial movement of the piston relative to the output pulley moveable sheave 32.

The nondisplaceable sheave 30, in addition to being welded to the torque converter casing 31, is welded also to cylinder 102 and extends along the axis of shaft 34 between the outer surface of the cylindrical portion 112 of the piston and the inner surface of the hub 120 that is formed integrally with sheave 32. At the axial end of hub 120 are located four radially inwardly directed and angularly spaced fingers 122 that seat within the recesses 114 at the end of the piston sleeve 112. These fingers seat on the radial surface 124 and against the face of snap ring 118. In this way, the fingers positively locate the hub of sheave 32 with respect to the piston. Therefore, as the piston moves axially due to the effect of the pressurized hydraulic fluid within cylinder 102, sheave 32 moves axially. But, fingers 122 also fit within slots 114 so that piston 104 and sheave 32 rotate as a unit without substantial relative angular displacement.

The assembly that comprises output sheave 30, torque converter casing 31, cylinder 102 and cylindrical sleeve 126 permits relative axial displacement of sheave 32 and piston 104 because the length of slots 128 allows fingers 122 to travel axially. However, the fingers fit within slits 128 so that sheave 30, cylinder 102 and sheave 32, rotate as a unit with piston 104.

Sheave 32 is supported on casing 60 by a lubricated bushing 130, which is supplied with hydraulic fluid, and is sealed at the end of the casing by an oil seal 132 so that the lid is contained within the casing and prevented from contaminating the conical surfaces of sheaves 30 and 32. Sheave 30 is supported on the inner surface of sleeve 112 by a dry, sliding support bushing 134. Hydraulic fluid is contained within the casing and prevented from flowing past bushing 134 by an O-ring 136, seated within a recess in sleeve 126, and a wiper seal 138, fitted within a recess within a inner surface of sheave 32. This sealing arrangement is detailed in FIG. 6.

Input actuation piston 162 is formed with a spline 194 that is in continuous engagement with spline 196 formed on the inner surface of cylinder 160. Any tendency for sheave 22 to rotate at a different speed than sheave 24 is prevented by this splined connection.

When torque is transmitted between the input and output pulleys, the belt applies an axial force to sheave 32, which produces a moment tending to rotate that sheave about an axis that is perpendicular to the axis of shaft 34. This tendency is reacted and prevented by of sheave 32 on bushing 134 and surface 140.

At the input pulley 23, displaceably sheave 24 is moved parallel to the axis of crankshaft 10 in accordance with the pressurized and vented state of an input clamping cylinder 160. Working within the cylinder is a piston 162, which is splined at 164 to sheave 24 so that they turn as a unit. Cylinder 160 is splined at 166 to crankshaft 10. Sheave 24 is supported rotatably on the crankshaft by a dry bushing 170 and a wet bushing 172. These bushing react the moment developed on sheave 24 due to belt tension force tending to rotate sheave 24 about an axis that is perpendicular to the axis of sheave 10.

The head of cylinder 102 is sealed by a disk 142 seated on the open-ended circumference of cylinder 102. The turbine blade assembly 82 of the torque converter is adapted to contact disk 142 and to transmit to the piston the thrust force developed on the blades of the turbine and directed parallel to the axis of shaft 34.

Hydraulic fluid that may leak past O-ring 136 is pumped by the action of centrifugal force along passage 144 through which it is returned to the sump in casing 60. This passage, which is formed along the cylindrical portion of sheave 32, communicates the outer surface of sleeve 126 between O-ring 136 and wiper seal 138 with the interior of casing 60.

At the right-hand end of shaft 34, bushing 146 supports the shaft on the wall of casing 90, and seal 148 hydraulically separates the lines that carry pressurized fluid to chamber 106 from the return lines that carry fluid exiting the torque converter. Oil seal 150 prevents any egress of oil from casing 90 that may pass support bearing 152, on which torque converter casing 31 and sheave 30 are rotatably supported.

The differential sprocket wheel 56, which is driveably connected by chain 54 to the output sprocket wheel 46, is formed integrally with a differential carrier 154 rotatably supported on bearings 156 and 158 on the differential casing 159. The front axle shafts that support the drive wheels of the vehicle are connected by constant velocity joints 161, 163 to the differential output shafts 167, 169, respectively. Carrier 154 supports shaft 153 on which bevel pinions 155, 157 are rotatably supported. Side bevel gears 159, 165 are in continuous meshing engagement with pinions 155 and 157 are are splined respectively to output shafts 167, 169. Power transmitted between sprocket wheels 56 and 46 is transmitted differentially to axle shafts 161, 163 by the differential mechanism.

A hydraulic pump 174, either a gear pump or a g-rotor pump is formed within casing and is supplied with fluid from the transmission sump. From the discharge of pump 174, hydraulic fluid is supplied to a hydraulic control system that supplies pressurized fluid to spaces 106 and 184 within the output and input actuating cylinders 102, 160, respectively. Hydraulic passages 178-182 connect the discharge from the space within output actuating cylinder 102, which is filled from the torque converter discharge or directly from the sump where the cylinder is located. Therefore, as space 106 is pressurized, the low pressure fluid within cylinder 102 is used to fill space 176 within the input actuating cylinder 106. But when cylinder 106 is pressurized, the oil displaced from space 176 flows to the sump and not to cylinder 102, because the low pressure side of cylinder 102 is continuously filled from the sump. Sheave 24 moves axially on shaft 10 in accordance with the pressurized and vented state of the space 184 located at the right-hand side of piston 162. This space is supplied through hydraulic passages 186-189, which carry relatively high pressure fluid to cylinder 160, whereas space 176 is pressurized at relatively low pressure. FIG. 2A shows the belt, pulley and piston in an underdrive position.

An O-ring 190 located in a recess formed on the inner surface of sheave 24 seals hydraulic fluid within the passages that supply space 176, and a wiper seal 192 provides a second means for preventing the egress of oil from the hydraulic passages. This sealing arrangement is detailed in FIG. 5. The space between O-ring 190 and wiper seal 192 communicates through passages 194-196 to space 176 within cylinder 106. Fluid that may leak past the O-ring is carried to the cylinder in passages 194-186 through the action of centrifugal pumping effect, thereby preventing hydraulic fluid from flowing past dry bushings 170 and contaminating the inner conical surfaces of sheaves 22 and 24.

In operation, when the transmission is to be shifted to an overdrive position, space 184 is pressurized to a magnitude determined by the control system and piston 162 is moved against the effect of the pressure force developed within space 176 at the left-hand end of the cylinder. This action forces sheave 24 leftward and forces drive belt 26 radially outward on the support provided by input pulley 23. A corresponding action is taken at the output pulley 31, where sheave 32 is moved axially toward sheave 30 by pressurizing space 103 on the left-hand side of piston 104. The pressure force developed on the face of the piston causes sheave 32 to move to the position shown in FIG. 2B.

When the transmission is required to operate at a lower drive ration, space 184 in cylinder 160 is vented and the pressure force developed on the left-hand side of piston 162 forces sheave 24 axially away from sheave 122 and the drive belt radially inward to the position shown in FIG. 2A. A corresponding action is taken at the output pulley 31 where space 106 is pressurized by the hydraulic control system causing piston 104 and sheave 32 to move axially toward sheave 30, thereby causing the drive belt to move a corresponding radially outward distance.

The pressure force developed on piston 162 as a result of the pressure continuosly maintained within space 176 balances any pressure increase that would result in space 184 due to the centrifugal pump action. In this way by maintaining fluid on sides of piston 162, the hydraulic control pressure within passages 184-189 determines the position of the piston within the cylinder. The increase in pressure within these passages that centrifugal pumping causes is balanced with regard to its effect on the position of piston 162 and sheave 24, by the pressure of fluid on both sides of piston 104. Hydraulic fluid flows from space 176 past the inner radius of flange 198 and returns to the sump of the transmission.

Similarly, output actuation cylinder is continuously filled with fluid on both sides of piston 104 so that any increase of hydraulic fluid pressure due to the centrifugal pumping action is balanced with regard to its effect on the position of piston 104 and sheave 32. Therefore, the magnitude of pressure supplied to space 162 by the hydraulic control system determines the position of the piston and sheave.

When the gear selector is moved between the forward the reverse drive positions, D. and R, it necessarily passes through a netural position, N. The hydraulic control system is adapted to control the pressure with actuation cylinders 102 and 160 such that the belt is unloaded and ceases to transmit power from the engine to the impeller of the torque converter. When the gear selector is moved to the neutral position, the torque converter and shaft 34 stop rotating. This eliminates converter drag torque at the synchronizer cones 76, 78 and facilitates engagement of the splines on the inner surface of sleeve 66 with disc 68 or 72 that corresponds to the position to which the gear selector is moved next from the neutral position.

The belt 26 is stiff and tends to assume a circular shape except when it transmits power between the pulleys unless it is constrained. Pads located in the belt cavity adjacent the outer surface of the belt on opposite sides are contoured and positioned to avoid contact with the belt throughout the ratio range from the extremities of the underdrive and overdrive positions. These pads constrain the belt within a defined space close to the pulleys when the belt is unloaded, as when the gear selector is moved to the neutral position.

Having described the preferred embodiments of my invention, what I claim and desire to secure by U.S. Letters Patents is:

1. A transmission for an automotive driveline connected to an engine for shifting continually among drive ratios comprising input pulley means driveably connected to the engine for engagement driveably by a drive belt at a continually variable radial distance from the axis of the engine shaft including:

a first sheave fixed against displacement and supported for rotation with the engine shaft;

a second sheave longitudinally displaceable with respect to the first sheave and supported for rotation with the engine shaft;

a hydraulic cylinder fixed for rotation with the engine shaft;

a piston displaceable within the cylinder and connected to the second sheave, defining in the cylinder a first variable volume connectable to a source of pressurized hydraulic fluid and a second variable volume connectable to a source of relatively low pressure fluid;

first dry bushing means for rotatably supporting the second sheave; and hydraulic sealing means for sealing against the flow of hydraulic fluid toward the dry bushing including first and second hydraulic seals spaced from one another along the axis of the engine shaft and first passage means for carrying hydraulic fluid away from the space between the first and second seals.

2. The transmission of claim 1 further comprising and output shaft directed parallel to the engine shaft; output pulley means mounted for rotation on the output shaft for engagement driveably by a drivebelt at a continually variable radial distance from the output shaft axis, said output pulley means including:
   a third sheave fixed against displacement and supported for rotation;
   a fourth sheave displaceable with respect to the third sheave supported for rotation with the third sheave;
   a second hydraulic cylinder fixed for rotation with the third and fourth sheaves;
   a second piston displaceable within the second cylinder and connected to the fourth sheave, defining in the second cylinder a third variable volume connectable to a source of pressurized hydraulic fluid and a fourth variable volume adapted to be filled from a source of relatively low pressure fluid;
   second dry bushing means for rotatably supporting the fourth sheave; and
   second hydraulic sealing means for sealing against the flow of hydraulic fluid toward the second dry bushing means.

3. The transmission of claim 1 wherein the first passage means hydraulically connects the second volume of said hydraulic cylinder and the space between the first and second seals.

4. The transmission of claim 1 wherein the first hydraulic seal is an O-ring located ajdacent the first passage means, the second hydraulic seal is a wiper seal located adjacent the first passage means, said O-ring and wiper seal being located at opposite axial sides of the first passage means and the first passage means hydraulically connects the second volume of said hydraulic cylinder to the space between said O-ring and wiper seal.

5. The transmission of claim 2 wherein the second hydraulic sealing means includes:
   third and fourth hydraulic seals spaced from one another along the axis of the output shaft; and
   third passage means for carrying hydraulic fluid away from the space between the third and fourth seals.

6. The transmission of claim 5 further comprising a fourth passage means for hydraulically connecting the fourth volume of said second hydraulic cylinder and the second volume of the hydraulic cylinder.

7. The transmission of claim 5 wherein the third hydraulic seal is an O-ring located adjacent the third passage means, the second hydraulic seal is a wiper seal located adjacent the third passage means on the opposite axial side of said third passage means from the location of the third hydraulic seal.

8. The transmission of claim 2 further comprising:
   torque converter means for hydrodynamically connecting the third sheave to the output shaft, connectable to a source of pressurized hydraulic fluid from which it is supplied with fluid and supplying relatively low pressure fluid from its discharge side to the fourth volume of said second cylinder.

* * * * *